United States Patent
Paulson et al.

(10) Patent No.: US 6,709,258 B2
(45) Date of Patent: Mar. 23, 2004

(54) METHOD OF MAKING A MOLD FOR PATTERNED SURFACE ARTICLES

(75) Inventors: Verlyn H. Paulson, Menomonie, WI (US); Gary J. Geissler, Chippewa Falls, WI (US); Gerald M. Benson, Woodbury, MN (US); Chester A. Bacon, Jr., Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 201 days.

(21) Appl. No.: 09/897,861

(22) Filed: Jul. 2, 2001

(65) Prior Publication Data

US 2001/0032703 A1 Oct. 25, 2001

Related U.S. Application Data

(60) Division of application No. 09/379,398, filed on Aug. 24, 1999, now Pat. No. 6,322,652, which is a continuation-in-part of application No. 09/148,104, filed on Sep. 4, 1998, now abandoned.

(51) Int. Cl.[7] .............................................. B29C 53/36
(52) U.S. Cl. ...................................... 425/365; 425/385
(58) Field of Search ................................ 425/363, 368, 425/365, 385

(56) References Cited

U.S. PATENT DOCUMENTS

| | | | |
|---|---|---|---|
| 3,454,442 A | 7/1969 | Heller, Jr. ................. 156/274.8 |
| 3,689,346 A | 9/1972 | Rowland ....................... 156/245 |
| 3,791,020 A | 2/1974 | Babbitt ........................ 228/17.5 |
| 4,000,392 A | 12/1976 | Banas et al. ........... 219/121.64 |
| 4,025,159 A | 5/1977 | McGrath ....................... 350/105 |
| 4,110,577 A | 8/1978 | Spisak ........................... 219/591 |
| 4,155,693 A | * 5/1979 | Raley .............................. 425/363 |
| 4,202,600 A | 5/1980 | Burke et al. ................... 359/514 |
| 4,478,769 A | 10/1984 | Pricone et al. ................ 264/1.6 |
| 4,551,297 A | 11/1985 | BoHugo et al. .............. 264/224 |
| 4,577,088 A | 3/1986 | Sharp .................... 219/121 LD |
| 4,588,258 A | 5/1986 | Hoopman ..................... 350/103 |
| 4,751,777 A | 6/1988 | Savel, III .............. 29/149.5 R |
| 4,938,563 A | 7/1990 | Nelson et al. ............... 350/103 |
| 4,973,326 A | 11/1990 | Wood et al. ................. 604/391 |
| 5,138,488 A | 8/1992 | Szczech ....................... 359/529 |
| 5,148,966 A | 9/1992 | Minase et al. ............... 228/149 |
| 5,245,454 A | 9/1993 | Blonder ......................... 359/70 |
| 5,256,227 A | 10/1993 | Roelofs ........................ 151/157 |
| 5,304,223 A | 4/1994 | Pieper et al. .................. 51/293 |
| 5,312,387 A | 5/1994 | Rossini et al. .............. 604/389 |
| 5,435,816 A | 7/1995 | Spurgeon et al. ............. 51/295 |

(List continued on next page.)

FOREIGN PATENT DOCUMENTS

| | | |
|---|---|---|
| DE | 43 39 661 | 5/1995 |
| EP | 0 288 884 | 11/1988 |
| EP | 0 306 070 | 3/1989 |

OTHER PUBLICATIONS

"Standard Specification for Retroreflective Sheeting for Traffic Control" *ASTM* D4956–94 (Nov. 1994).
Patent Abstracts of Japan 58128287, Publication Date Jan. 27, 1982.

Primary Examiner—Robert Davis
Assistant Examiner—Thu Khanh T. Nguyen
(74) *Attorney, Agent, or Firm*—Carolyn A. Fischer

(57) ABSTRACT

The present invention relates to a method for making a substantially cylindrical tool from a substantially planar substrate, wherein the tooling has at least one patterned surface. The resulting tooling includes a patterned surface with a sufficiently strong weld that is capable of producing an article having a pattern surface that has a relatively narrow and preferably cosmetically pleasing seam line. Such articles include retroreflective sheeting, structured abrasive articles, adhesive articles suitable for use in personal care products, and the like.

3 Claims, 10 Drawing Sheets

U.S. PATENT DOCUMENTS

| | | |
|---|---|---|
| 5,450,235 A | 9/1995 | Smith et al. ................. 359/529 |
| 5,499,580 A | 3/1996 | Hoffmann et al. .......... 101/375 |
| 5,500,273 A | 3/1996 | Holmes et al. ............. 428/147 |
| 5,504,544 A | 4/1996 | Dreyer et al. ................. 353/38 |
| 5,558,740 A | 9/1996 | Bernard et al. ............. 156/231 |
| 5,575,873 A | 11/1996 | Pieper et al. ............... 156/153 |
| 3,207,644 A | 2/1997 | Hobson, Jr. et al. ..... 156/304.6 |
| 5,601,736 A | 2/1997 | Saitoh et al. .......... 219/121.69 |
| 5,603,853 A | 2/1997 | Mombo-Caristan .... 219/121.69 |
| 5,614,286 A | 3/1997 | Bacon et al. ................ 428/161 |
| 5,635,278 A | 6/1997 | Williams .................... 424/172 |
| 5,643,400 A | 7/1997 | Bernard et al. ............. 156/500 |
| 5,679,302 A | 10/1997 | Miller et al. ................. 264/167 |
| 5,706,132 A | 1/1998 | Nestegard et al. .......... 359/529 |
| 5,714,223 A | 2/1998 | Araki et al. ................... 428/68 |
| 5,754,338 A | 5/1998 | Wilson et al. .............. 359/530 |

\* cited by examiner

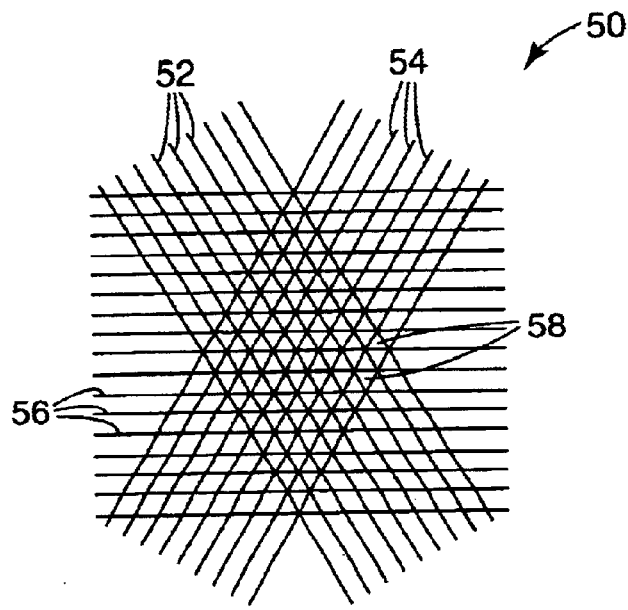
FIG. 13a
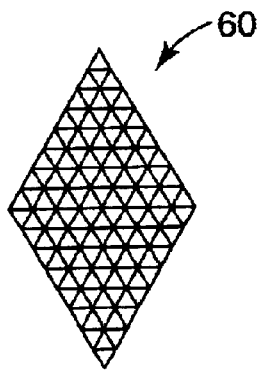
FIG. 13b
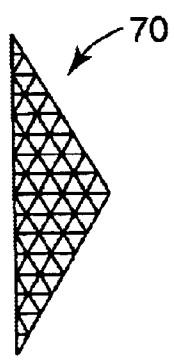   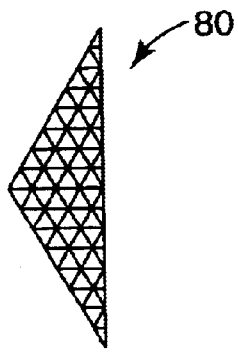
FIG. 13c    FIG. 13d

METHOD OF MAKING A MOLD FOR PATTERNED SURFACE ARTICLES

CROSS REFERENCE TO RELATED APPLICATIONS

This application is a Divisional of U.S. Application Ser. No. 09/379,398, filed, Aug. 24, 1999, now issued U.S. Pat. No. 6.322.652, which is a continuation-in-part of U.S. Application Ser. No. 09/148,104, filed Sep. 4, 1998, now abandoned.

TECHNICAL FIELD

This invention generally relates to a method for making a tooling or a mold for the manufacture of articles having at least one patterned surface, such as, for example, retroreflective sheeting, structured abrasive articles, and adhesive articles for personal care products. Also provided are molds and articles having at least one patterned surface.

BACKGROUND

Retroreflective sheeting is employed in many applications that enhance the safety of pedestrians and motorists. Many of these applications require the sheeting to have an eye pleasing or cosmetic appearance. One particularly useful type of retroreflective sheeting is cube-corner retroreflective sheeting. These types of retroreflective sheetings typically include a sheet having a generally planar front surface and an array of cube corner reflecting elements protruding from the back surface. The cube corner reflecting elements generally include trihedral structures (i.e., generally having three approximately mutually perpendicular lateral faces meeting in a single corner). In use, the retroreflector is arranged with the front surface disposed generally toward the anticipated location of the intended observers. In this orientation, light incident to the front surface enters the sheet, passes through the body of the sheet to be internally reflected by the faces of the cube corner reflecting elements so as to exit the front surface in a direction substantially toward the light source, i.e., retroreflection.

The manufacture of retroreflective cube corner element arrays is typically accomplished by employing molds primarily made by known techniques, including pin bundling and direct machining. Molds manufactured by pin bundling are made by assembling together individual pins which each have an end portion shaped with features of a cube corner reflective element. The direct machining technique, also known as ruling, involves cutting away portions of a substrate to create a pattern of grooves that intersect to form structures including cube corner elements. This grooved substrate is typically used as a master from which a series of impressions, replicas, or molds may be formed. These are typically then used as molds for retroreflective sheeting. An example of direct machining is described in U.S. Pat. No. 4,588,258 (Hoopman).

Once the mold is made, retroreflective sheetings are then typically made either by thermally embossing a plastic sheet with the grooved substrate to form a molded surface or by subsequently depositing a crosslinkable, partially polymerized resin, on a mold to be replicated which is then typically exposed to radiation, e.g., actinic light or heat, to solidify the resin. An example of such replication is described in U.S. Pat. No. 3,689,346 (Rowland).

Such manufacturing processes are typically continuous processes. For continuous manufacturing of retroreflective sheeting, a tool is generally formed from a flat originally ruled substrate, or a replica thereof, into a cylinder with one or more welding lines across the width of the sleeve. The resin composition flowing into the weld line tends to stick to the molding surface and cause objectionable seam lines and defects in the resulting sheeting. Moreover, in the step of bonding an overlay film to the array of cube corner elements, defects tend to result when the weld line aligns with an embossing protrusion on an embossing roll.

The efficiency and appearance of retroreflective sheeting can be affected by thermal or mechanical stresses, effects of resin shrinkage, removal from the mold, and the shape of the mold itself. For example, in a majority of retroreflective sheeting, seam lines can be observed across the width of the retroreflective sheeting. Because these seam lines reduce the cosmetics of the sheeting and, in some instances, impair the overall retroreflectivity of the sheeting, attempts have been made to eliminate them. For example, U.S. Pat. Nos. 5,643, 400 and 5,558,740 (both to Bernard et al.) describe an apparatus and a method, respectively, for producing retroreflective sheeting, wherein at least two mold surfaces are used to generate two prism arrays which are overlapped at a leading and/or a trailing edge of each array.

SUMMARY

What is yet needed is a method for making a tool having at least one patterned surface with a sufficiently strong weld that is capable of producing a cosmetically pleasing narrow seam line on an article having at least one patterned surface, such as retroreflective sheeting.

As used herein, "tooling" or "tool" refers to a substrate having at least one patterned surface that forms an original template from which other articles can be replicated, such as a mold or an article, such as retroreflective sheeting, an abrasive article, and the like. Typically, the tooling contains multiple patterned tiles that are joined together forming lay-up lines between the individual tiles. The tooling may include more than one tooling segment, which could be utilized as an original template by itself.

As used herein, "mold" refers to a structure formed by the tooling. It is the mold that typically is utilized in further replication processes in producing articles such as retroreflective sheeting, an abrasive article, and the like.

The present invention provides a method of making a tooling, including providing a substantially planar tooling having a first end and a second end opposing one another, a patterned side, and a back side opposite the patterned side; placing the opposing ends together to form a substantially cylindrical shape forming a lumen therein, wherein the back side faces the lumen; and welding the ends together from the lumen such that at least the opposing ends of the back side are joined. In one embodiment, the substantially cylindrical shape has a substantially circular cross section.

Preferably, welding the ends together includes welding the ends together from the lumen with less than 100% penetration of a resulting weld. The opposing ends are preferably held together during the welding process using a fastener selected from the group of a mechanical clamp, a magnetic plate, or application of a vacuum. In accordance with the present invention, welding the opposing ends preferably produces a joining line having a width of about 0.0025 mm to about 0.2 mm on the patterned side. The tooling may also include more than one tooling segment such that the tooling comprises more than one joining line having a width of about 0.0025 mm to about 0.2 mm on the patterned side.

In one embodiment, the tooling includes a metal. Preferably, the metal is selected from the group consisting of aluminum, brass, copper, nickel, and combinations thereof. If desired, other materials and/or metals may be used.

Welding the opposing ends in accordance with the present invention preferably includes exposing the back side of the tooling to a laser selected from the group consisting of a carbon dioxide laser, a ruby laser, an Nd:glass laser, and an Nd:YAG laser. The tooling is preferably exposed to a laser at a feed rate of about 2.5 cm/minute to about 1600 cm/minute. The tooling is preferably exposed to a laser at a pulse rate of about 5 pulses per second to about 100 pulses per second. The tooling is preferably exposed to a laser at a power per pulse of about 20 joules or less per pulse.

A method in accordance with the present invention may also include placing a heat sink adjacent to the patterned side after placing the opposing ends together.

A joint formed in accordance with the present invention may result from one of the configurations selected from the group consisting of a butt joint, a wedge joint, an overlapping joint, or a raised ridge joint.

Another aspect of the present invention is a mold produced by the tooling made by the method as described above, wherein the mold comprises a joining line having a width of about 0.0025 mm to about 0.2 mm on the patterned side.

A further aspect of the present invention provides an article including at least one patterned surface produced using a mold described above, the at least one patterned surface having a seam of substantially the same width as the joining line of the mold.

Yet another aspect of the present invention provides a microstructured composite sheeting including a three dimensional array of cured microstructure elements formed from a polymeric material, wherein any seam present in the array has a width of about 0.0025 mm to about 0.2 mm on the patterned side.

Another aspect of the present invention provides a mold for making an article having a patterned surface, the mold comprising a patterned surface outer surface, an inner surface, and a joining line having a weld penetration of less than about 100% of a tooling thickness.

The present invention addresses the problem of reducing seam appearance at the tooling, or substrate, stage so that the process of producing patterned surface articles (sometimes referred to herein as "replicate") remains relatively simple, as opposed to addressing the problem at the replication stage, as described in U.S. Pat. Nos. 5,643,400 and 5,558,740 (both to Bernard et al.).

BRIEF DESCRIPTION OF THE DRAWINGS

FIGS. 13a to 13f illustrate tooling of the present invention, wherein the tooling contains multiple patterned tiles that are joined together forming lay-up lines between the individual tiles that parallel the groove lines of the tool.

DESCRIPTION OF ILLUSTRATIVE EMBODIMENTS

The present invention provides a substantially cylindrical tool having at least one patterned (or molding) surface that is preferably formed from a flat originally ruled substrate, or a replica thereof. The tool is preferably made by welding a joint from a surface opposite the at least one patterned surface to yield a strong weld. The tooling so made subsequently yields a relatively narrow seam line, preferably having a width of about 0.0025 mm to about 0.2 mm, on the retroreflective sheeting produced therefrom, wherein the seam line is cosmetically pleasing to the observer.

Although the present invention is described with particular attention to retroreflective sheeting, the present invention can also find use in other applications where a molded or patterned surface is manufactured. Such applications include the manufacture of structured abrasive articles, as described in U.S. Pat. No. 5,304,223 to Pieper et al., U.S. Pat. No. 5,500,273 to Holmes et al., and U.S. Pat. No. 5,435,816 to Spurgeon et al., to name a few; adhesive articles and mechanical fasteners in personal care products, as described in U.S. Pat. No. 4,973,326 to Miller et al., U.S. Pat. No. 5,312,387 to Midgley et al., and U.S. Pat. No. 5,679,302 to Bychinski et al., for example; brightness enhancer films as described in U.S. Pat. No. 5,245,454 to Blonder, U.S. Pat. No. 5,504,544 to Dreyer et al., and U.S. Pat. No. 5,635,278 to Williams, for example.

Figure 1:
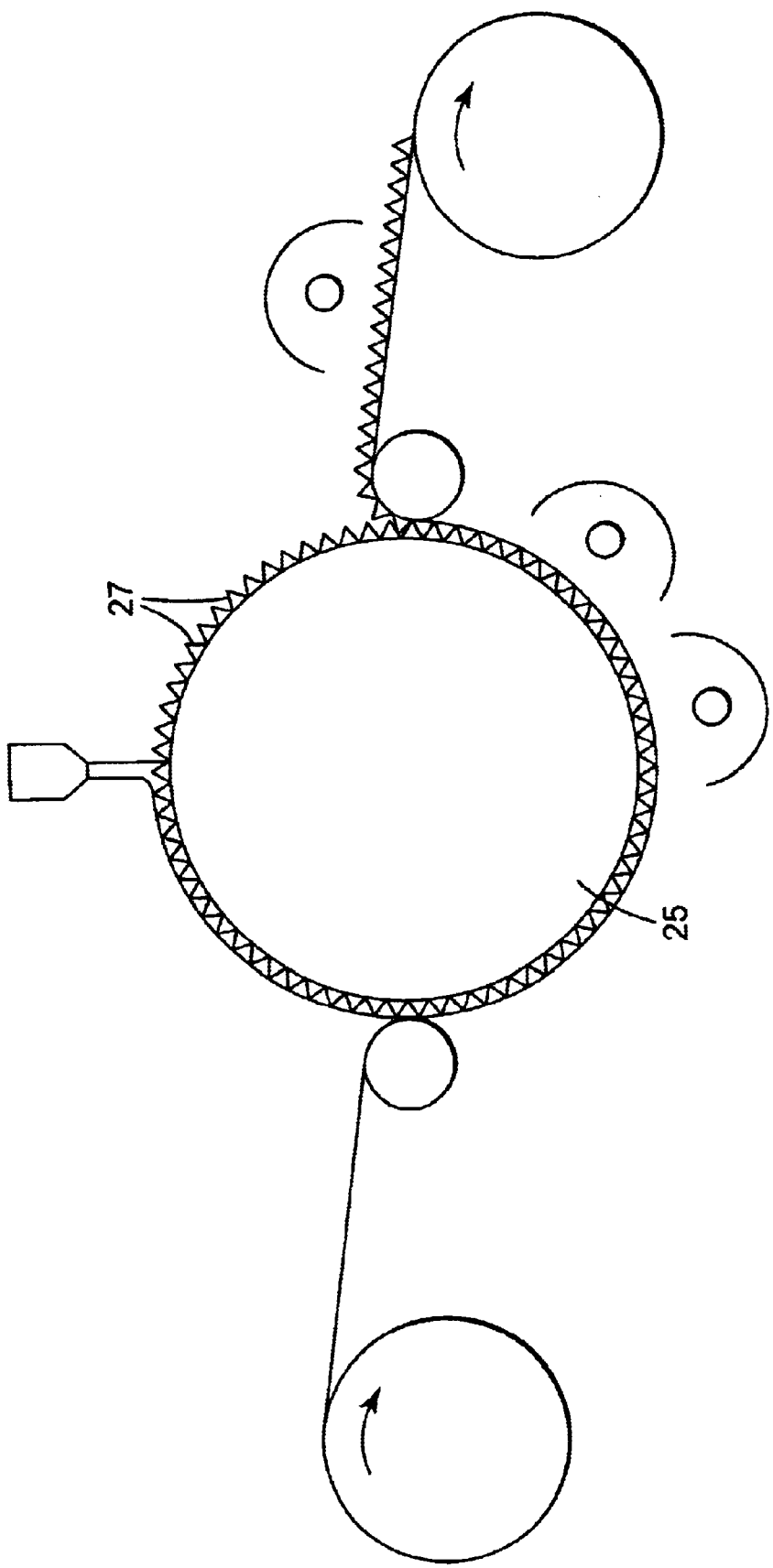
FIG. 1 is a schematic representation of an illustrative process configuration using a tooling in accordance with the present invention.

FIG. 1 is a schematic representation of an illustrative process configuration showing, in part, a rotating mandrel 25 with a sleeve 27 thereon. The sleeve is an illustrative shape of a tooling. Although one skilled in the art will recognize many techniques for placing the sleeve on the mandrel, in one embodiment, a substantially cylindrical sleeve is heated and placed on the mandrel so that the sleeve, upon cooling, shrinks onto the mandrel. The term "substantially cylindrical" refers to an elongated hollow structure defining a lumen, or open space, therein and having a cross section shape selected from the group of a circle, an oval, an ellipse, and the like. Alternatively, the sleeve can be otherwise attached to the mandrel with an adhesive (e.g., thermoset organic adhesive, solder, etc.), or with a mechanical means such as one or more pins or one or more clamps. The sleeve can be of various sizes and can have multiple combinations of sleeve diameter and thickness of the material forming the sleeve, depending upon the desired purpose of the end tooling.

For example, in the fabrication of retroreflective sheeting material, the sleeve is preferably between about 20 to 130 centimeters in diameter. However, one with ordinary skill in the art will readily appreciate that the diameter of the sleeve can be of any size that is appropriate depending upon the size of the processing equipment, e.g., a welder and/or an embossing apparatus. The material forming the sleeve can have a thickness between about 0.25 to 2.5 millimeters, more preferably between about 0.4 to 1.0 millimeters, although any thickness can be used so long as the material can be formed into a substantially cylindrical shape.

In forming the sleeve, one embodiment includes coiling the tool into a cylinder in a fashion that results in essentially zero force needed to hold the ends of the tool together, i.e., there are substantially no residual forces remaining in the tool which would tend to spring apart the ends so that the tool returns to the originally flat shape. This can be accomplished by using a rolling process, wherein an apparatus is typically employed that rolls and/or curves a full curve in a cylindrical shape in one step, generally under the application of high pressure. An example of a suitable apparatus for a rolling process is commercially available under the trade designation of ONE-PASS ROLL BENDING MACHINE, from Acrotech, Lake City, Minn. This can be accomplished with or without the use of some form of clamping means to hold the ends of the tool together. Examples of clamping means are (1) copper clamps, (2) magnetic plates, and (3) vacuum application.

The tool has a molding surface, i.e., a patterned surface, typically having a plurality of dentations (e.g., indentations) that have the shape and size suitable for forming desired reflective elements. In the tooling, the opening at the top surface of each indentation corresponds to the base of a resultant reflective element. Suitable indentations, and thus resultant reflective elements, may be three sided pyramids having one cube corner each including such as are disclosed in U.S. Pat. No. 4,588,258 (Hoopman), or may have a rectangular base with two rectangular sides and two triangular sides such that each element has two cube corners each including such as are disclosed in U.S. Pat. No. 4,938,563 (Nelson et al.). Further, each indentation has a depth that corresponds to the resultant retroreflective element height. As examples, each indentation can have a depth (and therefore yield reflective elements of a height) of 0.06 mm, 0.09 mm and 0.18 mm. However, those skilled in the art will readily appreciate that the plurality of indentations in the tooling may have any shape and a given tooling may include a variety of indentation shapes and sizes, in accordance with the present invention. Those skilled in the art will also readily appreciate that protrusions may be used in place of or in addition to indentations.

In forming a plurality of reflective elements, a flowable resin is typically applied to the molding surface, i.e., patterned surface, of the tool. The resin should be such that it flows, optionally with applied vacuum, pressure, or mechanical means, against the molding surface (e.g., into the cavities in the molding surface). For molds having indentations, it is preferably applied in sufficient quantity that it at least substantially fills the plurality of indentations. For molds having a reverse pattern (e.g., protrusions such as would be necessary to fabricate the sheeting described in copending U.S. Ser. No. 09/227,963, which is herein incorporated by reference) the resin is preferably applied in sufficient quantity that it substantially covers the protrusions and adapts to the tool surface. Resins selected for use in the array of cube corner elements preferably yield resultant products,that provide highly efficient retroreflection as well as sufficient durability and weatherability. Illustrative examples of suitable polymers include acrylic, polycarbonate, polyester, polyethylene, polyurethane, cellulose acetate butyrate polymers, and polyvinyl chloride, for example.

In many instances, it may be desired to use a first or later generation replicate of a molded or patterned surface as the tool. Depending upon the tool used and the nature of the resin composition, the plurality patterned reflective elements may separate from the tool readily once cured, or a parting layer may be necessary to achieve desired separation characteristics. Illustrative examples of parting layer materials include an induced surface oxidation layer, an intermediate thin metallic coating, chemical silvering, combinations of different materials or coatings. If desired, suitable agents may be incorporated into the resin composition to achieve desired separation characteristics once the resin has cured.

A tooling for replication of reflective elements is typically formed on a substantially flat plane from a substrate material that is suitable for a direct machining technique, as defined below. Particularly preferred materials are those that machine cleanly without burr formation, exhibit low ductility and low graininess, and maintain dimensional accuracy after surface formation. Metals are one preferred substrate material because they can be formed in desired shapes and provide excellent optical surfaces to maximize retroreflective performance of a given reflective element configuration. Preferred metals include aluminum, brass, copper, and nickel, to name a few. A variety of machinable plastics can also be used (including both thermoset and thermoplastic materials), e.g., acrylics.

The "direct machining" technique, also known generally as "ruling," comprises cutting away portions of a substrate to create a pattern of indentations or grooves that intersect to form structures which form the resultant reflective elements, including cube corner elements. Direct machining is a suitable technique for manufacturing master molds for small microcube arrays. Small microcube arrays are particularly beneficial for producing thin replica arrays with improved flexibility. Microcube arrays are also more conducive to continuous process manufacturing. The process of manufacturing large microcube arrays tends to be easier using direct machining methods rather than other techniques. An illustrative example of direct machining is disclosed in U.S. Pat. No. 4,588,258 (Hoopman).

The direct machining process forms a flat "ruled master" piece (or "tile") that contains a desired pattern. Because the tiles are usually smaller than the size of the tooling desired, the edges of individual tiles are machined to size. These pieces are then assembled to form a composite tooling. In the past, these tiles were assembled by adhering the joints of each tile with the use of a conventional adhesive. One with ordinary skill in the art will appreciate that the means for assembling the pieces may depend on the size of the pattern on the tile. For example, it is particularly desirable to form smaller joints (also known as "lay-up lines") between the individual tiles when the pattern includes relatively small cube pattern because it has been found that the lay-up lines tend to be more conspicuous in a retroreflective sheeting made from smaller cube patterns.

Figure 2:
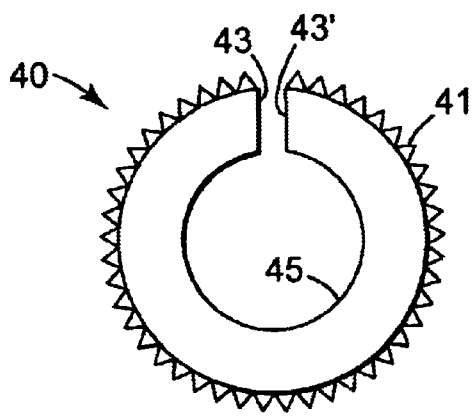
FIG. 2 is a side view of a sleeve showing a cross section of the thickness of a weld joint.

These lay-up lines between the tiles are preferably less than 0.0025 millimeters and are difficult to detect with the naked eye in the flat substrate assembly. Assembly of these pieces of patterned substrate can be utilized as a master from which a series of impressions, i.e., replicas, may be formed. In some instances, the master itself is useful as a retroreflective article. However replicas, including multi-generational replicas, are more commonly used as the retroreflective article. When the tooling is of the desired size, it is typically coiled into a sleeve 40, as shown in FIG. 2, having a patterned surface 41 and a back side 45. The sleeve 40 is preferably formed by bringing opposing ends 43 and 43' in close proximity to one another so that they may be permanently joined.

Figure 3:
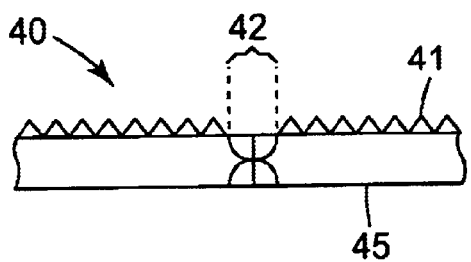
FIG. 3 is a cross section of a conventional two-sided weld joint.

A cross-section of a conventional weld line 42 is shown in FIG. 3, wherein the ends of the sleeve generally joined together by forming a butt joint and then welding on both the front side, i.e., the patterned side, and the opposing back side. The weld line 42 that is typically formed on the pattern of the tooling is approximately 0.5 to 1.0 millimeters wide. This weld line produces a seam in the resultant mold or article, such as retroreflective sheeting, replicated therefrom. In a retroreflective sheeting produced by such a tooling, the seam is more visible than is desired in daylight and retroreflected light. The textured surface of the seam causes scattering of the reflected light and makes the seam very visible. This is especially true if the retroreflective sheeting made from a tooling that has a metal coating thereon. Moreover, the flowable resin tends to adhere to the weld line to form defects in the finished retroreflective sheeting. Additionally, physical distortion in the pattern adjacent to a weld line can produce a retroreflective sheeting that includes an undesirable optical gradient.

Figure 4:
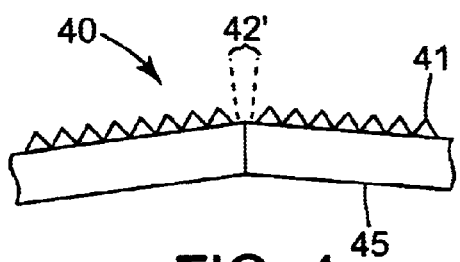
FIG. 4 is a cross section of a back side weld joint with excessive power penetration during welding, thereby causing the sleeve to bow outward.

FIG. 4 illustrates a resultant weld line 42 produced from a conventional attempt to weld from the back side, particularly with high power lasers. The tooling tends to bow outward away from sleeve center. Therefore, in addition to producing an unsuitably wide weld line, the shape of the tool is distorted which also results in defects in the retroreflective sheeting.

Figure 5:
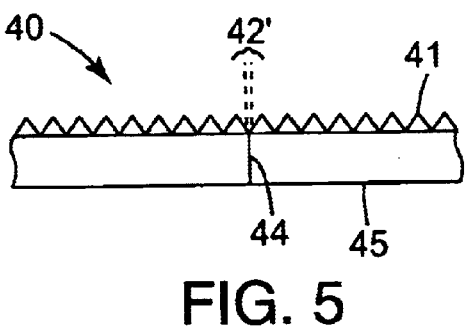
FIG. 5 is a cross section of a back sided weld on a butt type joint.

FIGS. 5 to 10 and 12a and 12b are examples of cutting the opposing ends of the tool to a target shape, in accordance with the present invention, in order to offset the above-mentioned problems. In FIG. 5, a butt type joint is shown with a back side weld resulting in a joining line 44, as representative of one embodiment of the invention. A joining line 44 is preferably formed in accordance with the present invention by joining the opposing ends together from the backside of the tool using a welder.

Although many types of welders are considered suitable, one preferred is a laser welder. Laser welders are generally can be of four types: a carbon dioxide laser that uses a mixture of helium, nitrogen and carbon dioxide; a ruby laser that uses a synthetic ruby with chromium in aluminum dioxide; an Nd:glass laser that uses neodymium in glass; and an Nd:YAG laser that uses a yttrium, aluminum, and garnet crystal doped with neodymium. One suitable laser welder of a YAG type is commercially available from HDE Systems Inc., Sunnyvale, Calif., or from LMI, Somerset, Wis.

Preferably, the laser is mounted on a carriage sufficiently small to fit within the diameter of the sleeve. The key variables in the welding process are (1) the feed rate of the laser beam along the weld line in units of centimeters per minute (cm/min); (2) the pulse rate in pulses per second (pps); and (3) the power per pulse (pp). These variables determine the spot size per pulse and the percent of penetration of the weld. The above welding variables are preferably set so as to not achieve 100% penetration of the tooling thickness when welding from the back side. One hundred percent penetration is seen as blisters or bubbles of molten material that emerge or erupt from the patterned surface side of the tool in or near the weld line. Although these blisters may be ground off, the weld line then becomes unacceptably wide. A preferred maximum penetration of about 90% has been found to provide a weld having satisfactory strength for subsequent shrink fitting of the sleeve onto the mandrel while maintaining a minimum effect on the width of the joint and adjacent area on the patterned side of the tooling. Moreover, the power per pulse is preferably maintained at a minimum while achieving this weld penetration.

The width of the joining line, as viewed from the patterned side of the tooling, made by the present invention is typically from about 0.0025 millimeters to about 0.2 millimeters. Although dimensional or optical properties of cubes may be affected beyond this width, the color and visual appearance in daytime of the joining line of a retroreflective sheeting remains consistent within this width, yielding a pleasing improvement in the aesthetic appearance. Upon closer inspection of the joining line, it appears as a series of individual weld spots corresponding to the points of laser incidence. The spacing of the spots along the joining line is typically adjusted by adjusting the pulses per second of the laser, preferably such that the spots overlap. When the pulses per second are too low or the feed rate too high, the weld becomes discontinuous and weaker. The minimum percent weld penetration is determined primarily by strength requirements. This number depends on materials, thickness of the tool, and quality of the welder. The per cent weld penetration is desirably low for minimizing damage to the cubes on the molding surface of the tool.

As mentioned above, other parameters also impact the resulting joining line. For example, a preferred feed rate of the laser along the joining line is about 2.5 cm/min to 1600 cm/min. A preferred pulse rate is about 5 pps to about 100 pps. A preferred power per pulse is about 20 joules or less per pulse. Although preferred ranges have been given for welding nickel, those skilled in the art will readily be able to determine the settings of the above variables to produce a suitable per cent weld penetration in other materials based on the teachings of this invention.

Figure 6:
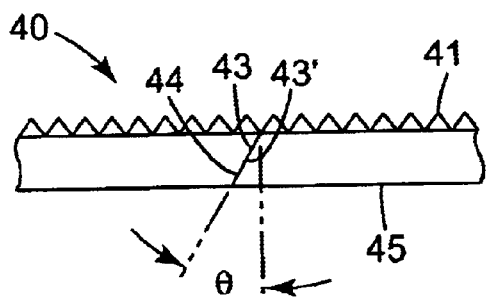
FIG. 6 is a cross section of a back sided weld on a butt type joint with the weld joint at an angle.

FIG. 6 shows a joining line 44 formed when the ends (43 and 43') of the tool are cut across the thickness of the tool and at an angle theta ($\theta$) to the radius of the sleeve. This embodiment is useful to avoid heat from the back side welding process rising directly to the molding surface and damaging the cubes.

Figure 7:
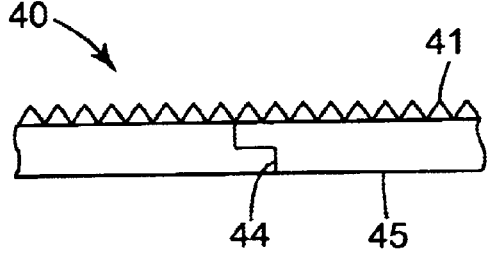
FIG. 7 is a cross section of a back sided weld on a lap type joint.

FIG. 7 shows an overlap type joining line 44. The benefit of this type of joining line is that a Mechanical interlocking increases the strength of the joint in addition to the effect from the back side weld.

Figure 8:
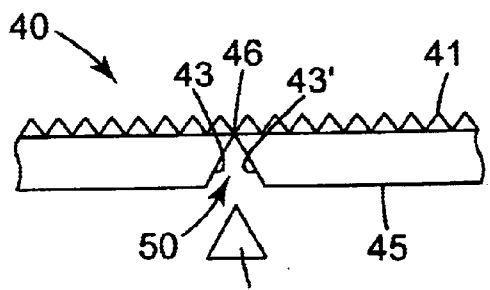
FIG. 8 is a cross section of a back sided weld formed by cutting ends of the sleeve at an angle and then inserting a wedge of weld material into the joint before welding.

FIG. 8 shows how a wedge joint 46 is formed, wherein the opposing ends 43 and 43' of the tool are cut so as to leave a wedge shape opening 50, with the base of the trapezoidal shape on the back side. As an example, a piece of nickel tooling was cut to this shape and a wedge of nickel 51 approximating the open area was inserted into the opening of the tool. A weld of suitable strength was obtained by then welding from the backside while minimizing damage to the molding surface of the tool.

Figure 9:
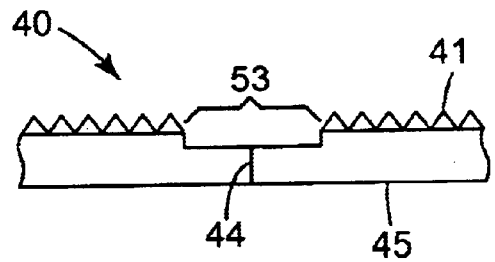
FIG. 9 is a cross section of a raised ridge weld.

FIG. 9 shows a raised ridge joint. Preferably, the cube corner elements are removed from a welding area 53 so that damage to the cubes is minimized. When the resin is cast into the tool, a raised ridge suitable for bonding to a sealing film was produced. It is noted that a pattern of indentations could be cut into the molding surface to provide ridges supporting the sealing film and avoiding any appearance of a joining line.

Figure 10:
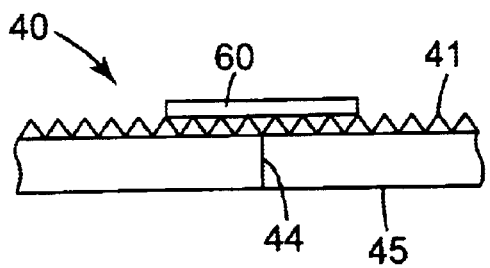
FIG. 10 shows a heat sink material placed on the molded side of the tool.

FIG. 10 shows a heat sink 60 placed onto a molding surface 41 of the tooling 40 for the purpose of minimizing the temperature of the patterned elements and, thus, reducing physical and optical distortion of the molding surface 41 and the width of the joining line 44. Any highly thermally conductive material may be suitable with copper being preferred. Additionally, a coolant may be directed through the heat sink material to further reduce surface temperatures.

Figure 11:
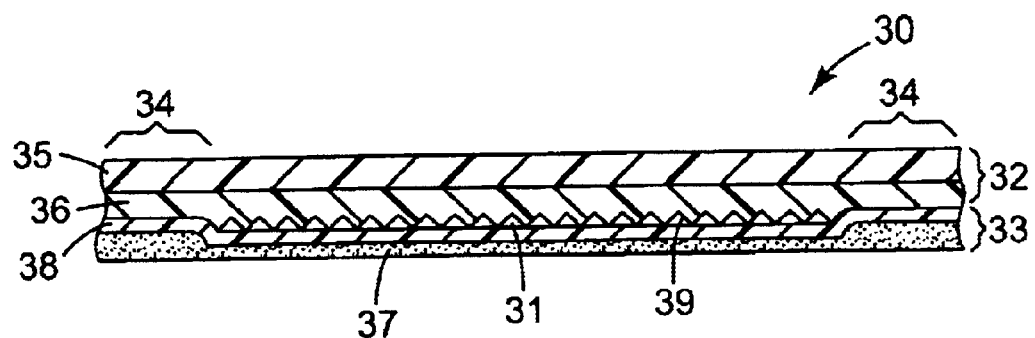
FIG. 11 is a cross section of a retroreflective sheeting.

FIG. 11 shows a sectional view of one type of cellular sheeting 30 having a substantially transparent face member 32, a base member 33, and supporting seal leg members 34 holding the face member in spaced relation to the base member. The face member, base member, and seal leg members form closed air cells 31. The members forming cells are called encapsulating members. A monolayer of retroreflective elements 39 as cube corners is contained within each cell so that the cube corners have an air interface. An example of cellular retroreflective sheeting is commercially available under the trade designation SCOTCHLITE DIAMOND GRADE Conspicuity Grade Sheeting Series 960 white, from 3M Company, St. Paul, Minn. A description of retroreflection and retroreflective sheeting is found in "Standard Specification for Retroreflective Sheeting for Traffic Control" ASTM D 4956–94 (November, 1994). Illustrative examples of cube corner-based retroreflective sheeting are also disclosed in U.S. Pat. No. 5,138,488 (Szczech); U.S. Pat. No. 5,450,235 (Smith); U.S. Pat. No. 5,614,286 (Bacon); U.S. Pat. No. 5,706,132 (Nestegard et. al.); U.S. Pat. No. 5714,223 (Araki et. al.); and U.S. Pat. No. 5,754,338 (Wilson et al.)

The face member 32 preferably comprises an overlay film 35 and a body portion 36. The body portion comprises a monolayer of retroreflective elements 39, such as cube corners. However a land layer typically exists as part of the body portion between the overlay layer and the monolayer of cube corners. The face member 32 may be a single material but typically comprises layers of different materials. Materials selected for the face member are preferably dimensionally stable, durable, weatherable, and readily formable into a desired configuration. The optional overlay film 35 may be selected from materials such as fluorinated polymers, ionomeric ethylene copolymers, low density polyethylenes, plasticized vinyl halide polymers, polyethylene copolymers, and aliphatic and aromatic polyurethanes. The thickness of the overlay film 35 is typically between about 0.01 to 0.2 millimeters. The land portion typically has a thickness less than 0.25 millimeters and preferably is desirable to have a minimum thickness at essentially 0 millimeters. The polymeric materials selected for the body portion 36 are thermoplastic and tend to be hard rigid materials with a high Vicat softening temperature relative to other polymers. Herein the term "thermoplastic" is used in its conventional sense to mean a material that softens when exposed to heat and returns substantially to its original condition when cooled. Examples of suitable materials for the body portion include acrylic polymers, acrylic epoxy, polycarbonates, polyimides, and mixtures thereof.

The base member 33 may also be called a backing sheet or sealing film. The base member 33 has a first side 38 in contact with either air or seal leg members and a second side typically having an adhesive 37 with liner (not shown) disposed thereon. The base member is disposed behind the monolayer of cube corner elements for the purpose of maintaining an air space around a majority of the cube corner elements. Preferably the base member shall comprise a thermoplastic material. Preferred polymers for use as the base member are within the styrenic family of multiphase copolymer resins as described in U.S. Pat. No. 5,754,338 (Wilson et al.). Typically the Vicat softening temperature of the base member is about 30° C. less than that of the body portion of the face member. The thickness of the base member is typically between about 0.01 to 0.25 millimeters.

The monolayer of cube corner elements may also be called prisms, microprisms, or triple mirrors. The height of the cube corner elements is generally between about 0.02 to 0.5 millimeters. This microstructured layer is molded into the body portion of the face member.

The seal leg members may also be known as supporting walls, bonds, or septa. The seal leg members are typically formed by application of heat and pressure to face member and base member, such as disclosed in U.S. Pat. No. 4,025,159 (McGrath).

Figure 12A:
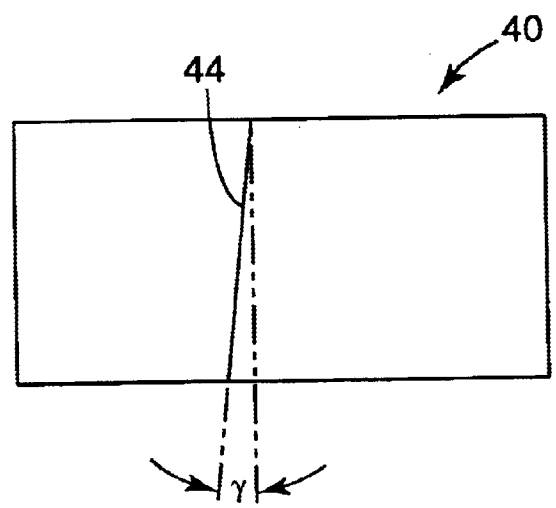
FIG. 12a is a plan view of a sleeve, wherein a weld line is at an angle to an axis of rotation of the sleeve.

On occasion, the protrusions on the embossing roll align with the joining line to result in a transparent line within the seal leg member. The angling of the joining line 44 as shown in FIG. 12a can be employed to solve this problem. As shown in FIG. 12a, a suitable value for angle gamma (γ) was found to be about 2.5 degrees, but any angle that reduces the alignment of the protrusions with the joining line is beneficial.

Figure 12B:
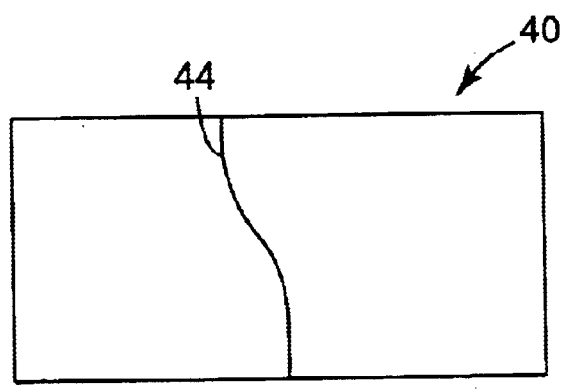
FIG. 12b is a plan view of a sleeve showing the weld line as a spiral.

FIG. 12b is an example of a variation to the idea of FIG. 12a, wherein the joining line 44 has the shape of a spiral across the width of the sheeting. As before, this shape also avoids the alignment of the joining line with the protrusions on the embossing roll. It will be appreciated by those skilled in the art that there are many target shapes that accomplish this objective within the scope of this embodiment.

In one preferred embodiment of the present invention, the joining line or lines are designed to parallel existing cavities or profiles of the tool's topography. In more preferred embodiments, the joining line also will not be straight across the belt or roll. As such, any reproduction of the joining line in the sheeting will not be parallel to a coating station or die lip. This feature helps avoid flow instabilities during coating processes and allows increased coating speeds. Also, when the joining line is angled in a diagonal configuration a longer weld is required. These longer welds preferably help achieve higher down-web strength, distribute stresses, and cause less "tenting" of the tooling when the tool is bent over a radius.

As previously mentioned, the scale-up process for such toolings often requires the joining of patterns into an extended web. Precise piece-to-piece matching is desirable but can be difficult to achieve. In the embodiment described in FIGS. 13a–13f the matching is facilitated by virtue that the edges of the trimmed masters run parallel to the groove lines of the tooling. Also, when assembled, the masters form a belt that has a joining line that runs parallel to the groove lines.

FIG. 13a illustrates how a master pattern 50 is formed by cutting a series of groove lines (52, 54, 56) in a surface. The cube corner points are not shown in FIG. 13a but would be raised protrusions inside of each full triangle 58 shown. As is appreciated by one skilled in the art, the orientation of the groove lines could be rotated by various degrees to provide sheeting having different optical angularity and/or other retroreflective properties (e.g., increased observation angle performance).

FIG. 13b illustrates a trimmed master 60 where all the grooves are present. FIGS. 13c and 13d illustrate alternative trimmed masters (70+80) for use as side sections for the scaled-up tooling.

Figure 13E:
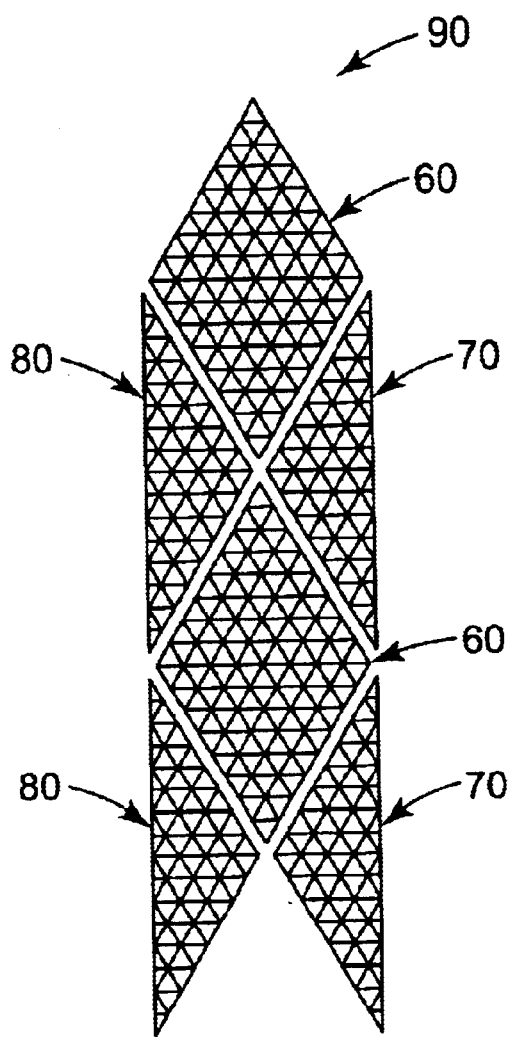
Figure 13F:
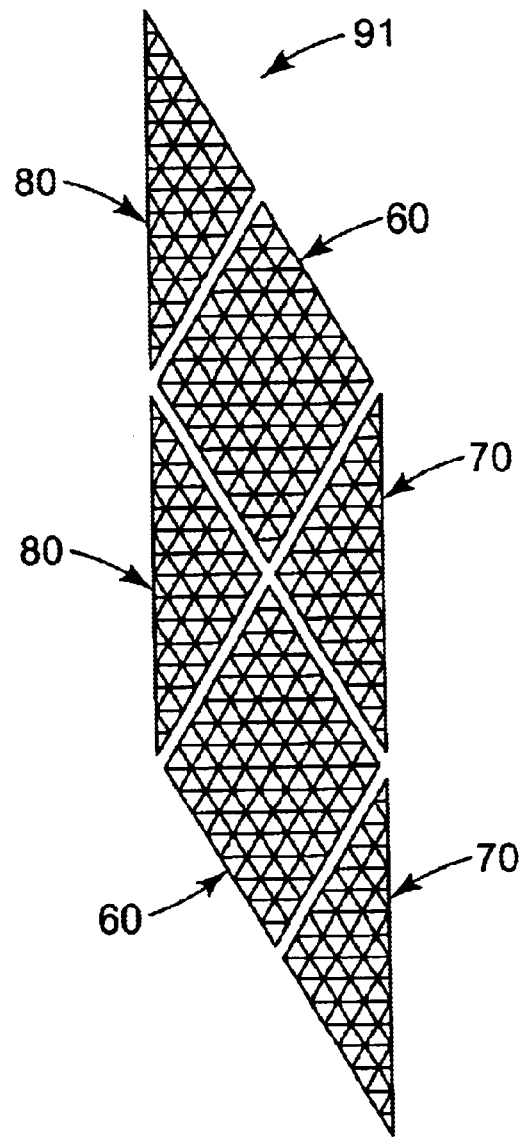

A finished tool may be produced by (i) joining trimmed masters (60, 70 and 80) as shown in FIG. 13e or 13f and (ii) welding the ends of the joined masters into a roll. As illustrated, the joining lines of FIG. 13e and FIG. 13f run parallel to the groove lines of the tool. As will be appreciated, the number of joined masters for a given tool will be determined by the size of the masters and the desired size of the final tool. In addition to the diamond- and triangle-shaped masters shown, other shapes can be utilized in accordance with the teachings of the present invention.

The assembly of the tool depicted in FIGS. 13a–f is well suited for use with the welding techniques described herein. Preferably, the ends of such tools are welded together from the lumen side of the cylinder. However, the tool depicted in FIGS. 13a–f may alternatively be welded from the non-lumen side and still offer the other advantages described herein. Furthermore, the tiling method described in FIGS. 13a to 13f can be used to assemble tools made with non-metal materials such as plastics (e.g., polycarbonate, polyester, acrylic, etc.). These tools still offer the significant advantage and benefit of having the joining lines running parallel to the groove lines of the tooling.

EXAMPLES

The present invention will now be described with reference to certain Examples, which are illustrative only.

The material used in forming the tooling was nickel (commercially available as pellets from INCO Ltd., Great Britain) that was electoformed to form a substantially flat tool having a thickness of 0.4 mm.

A flat substrate having a patterned surface and a back surface opposite the patterned surface was formed into a cylinder utilizing a rolling process, wherein the flat substrate was mounted on a rolling apparatus, commercially available under the trade designation ONE-PASS ROLL BENDING MACHINE, from Acrotech, Lake City, Minn.

The cylindrical sleeve was then placed on a mandrel and held in place using a mechanical clamp. A laser welder, commercially available under the trade designation LUMONICS JK 702, from Laser Machining Inc., Somerset, Wis., was placed within the center of the cylindrical sleeve. The laser was set accordingly: the feed rate of the laser along the cylinder interior was 63.5 cm/min., the pulse rate was 45 pulses per second, and the power per pulse was 6 joules per pulse.

Figure 14:
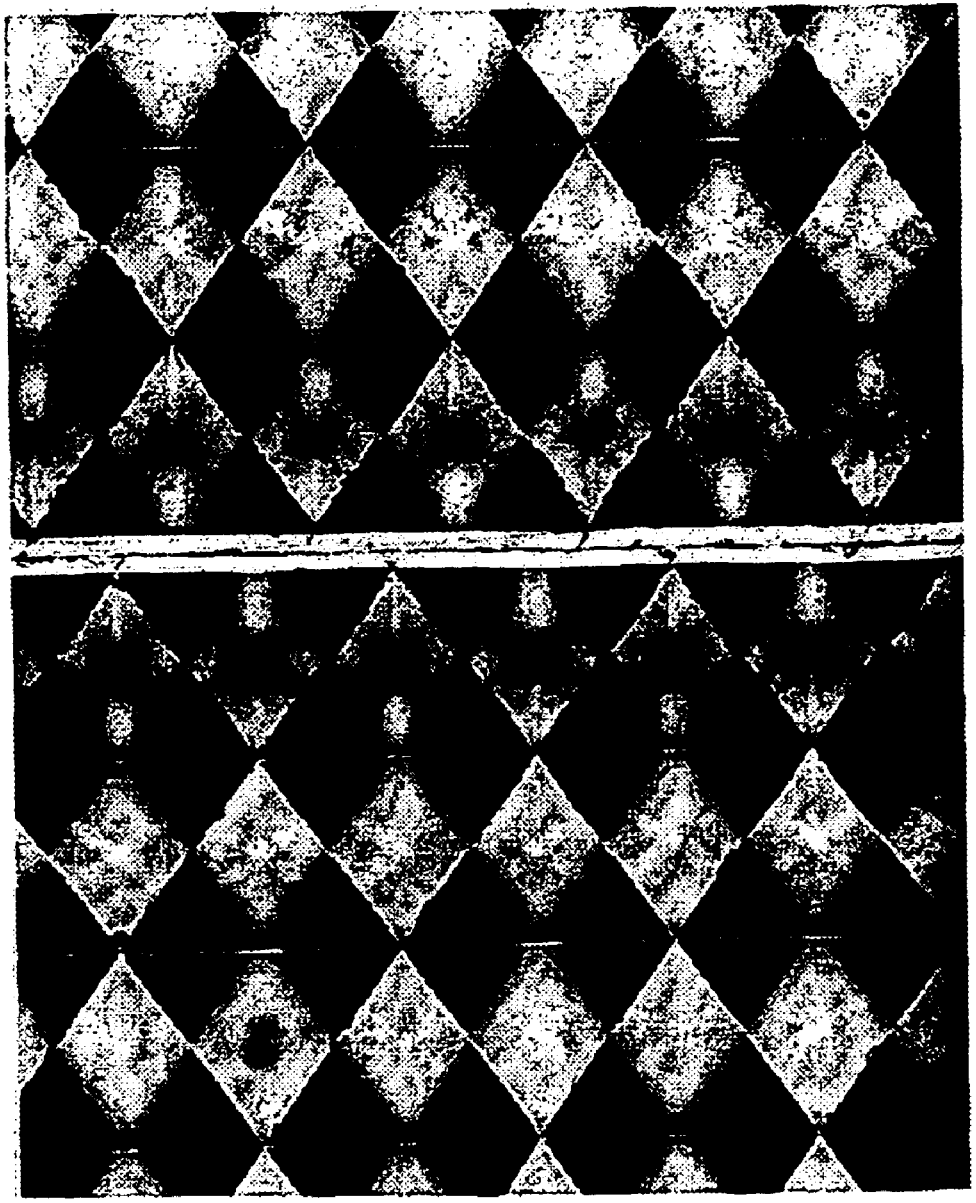
FIG. 14 is a photograph of a 50× magnification of a joining line in accordance with the present invention.
Figure 15:
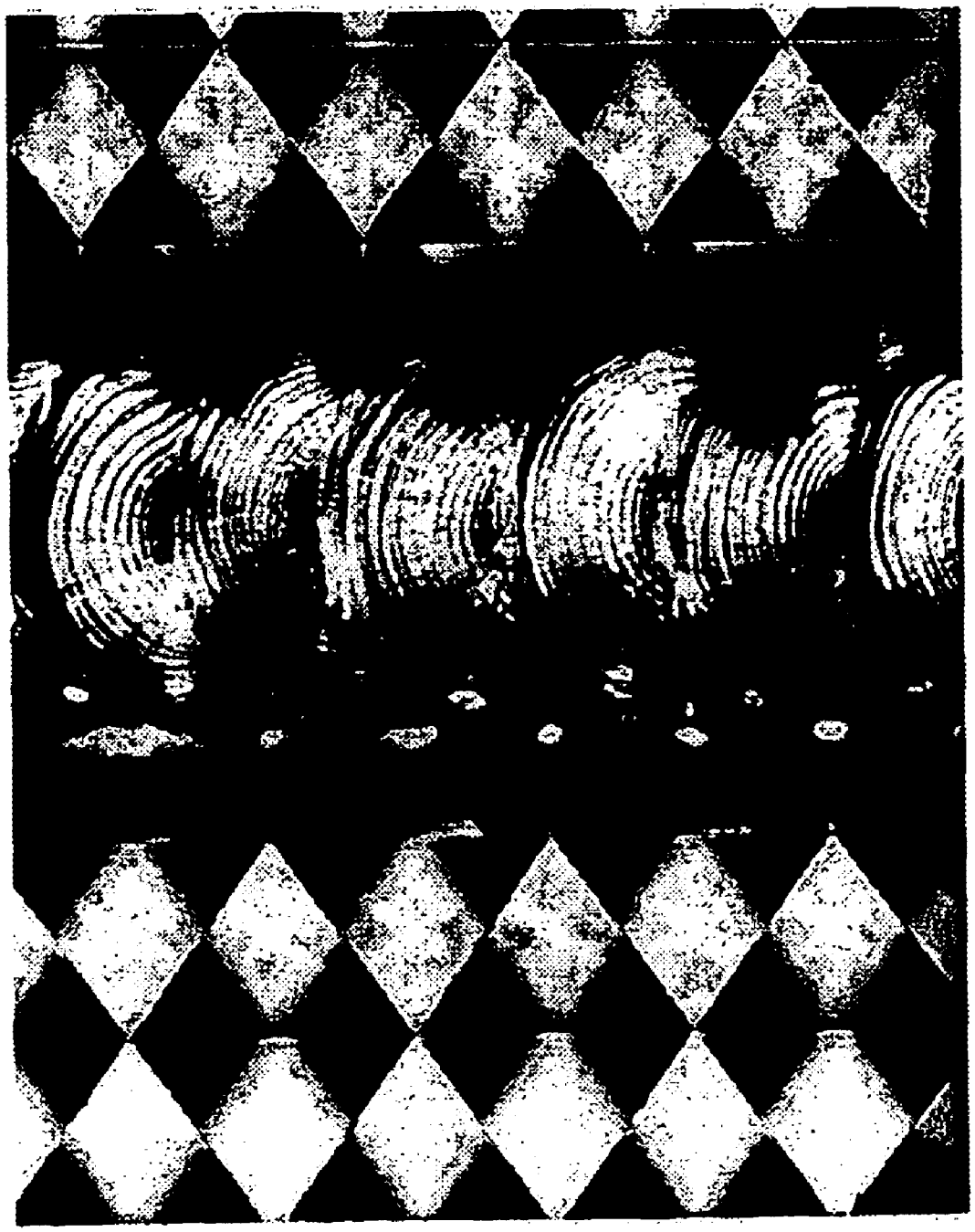
FIG. 15 is a photograph of a 50× magnification of a conventional weld line.

FIG. 14 is a photograph of a 50× magnification of a joining line, as described above. It was determined that the width of the joining line was 0.008 mm. In contrast, FIG. 15 is a photograph of a 50× magnification of a conventional weld line. It was determined that the width of that weld line was 0.7 mm. It was also noted that the deformation of the patterned surface in the tooling was observed near the weld line.

Figure 16:
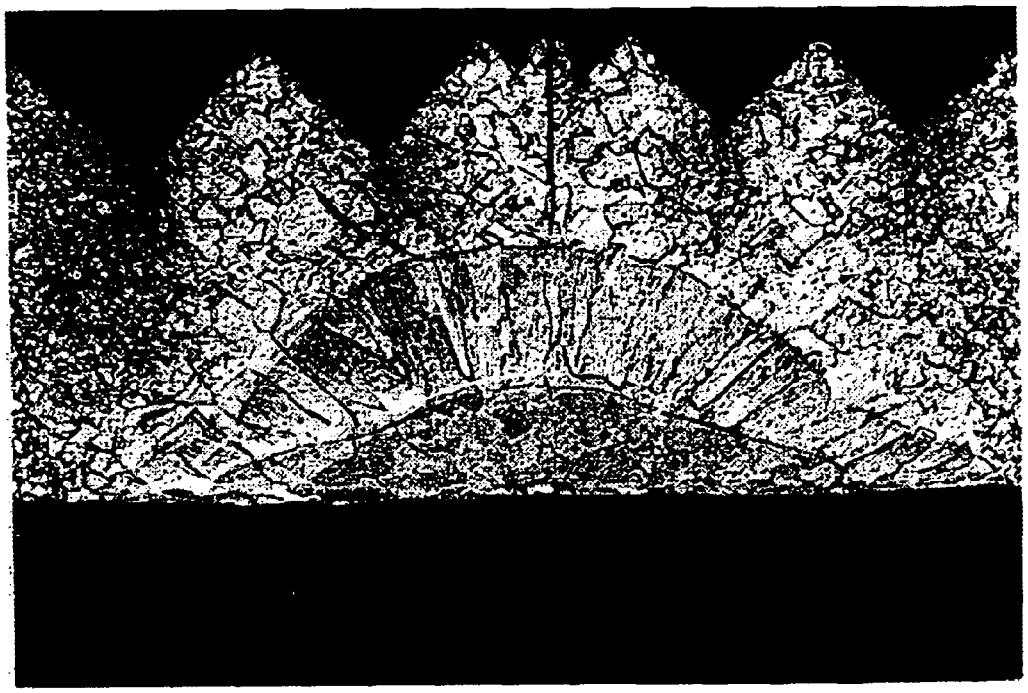
FIG. 16 is a photograph of a 50× magnification of a cross sectional view of a joining line in a tooling manufacturing in accordance with the present invention.
Figure 17:
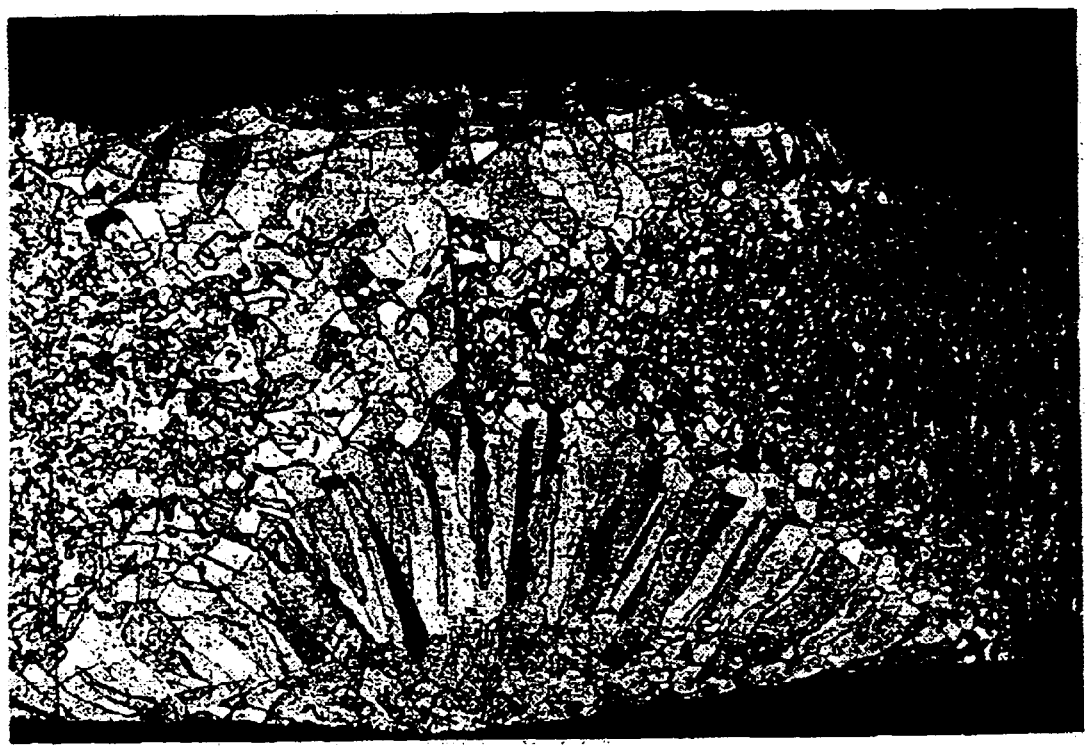
FIG. 17 is a photograph of a 50× magnification of a cross sectional view of a conventional weld line in a conventional tooling.

FIG. 16 is a photograph of a 50× magnification of a cross sectional view of a joining line in a tooling manufacturing in accordance with the present invention. As shown in FIG. 16, the pattern near the joining line remained substantially in tact throughout the welding process. In contrast, FIG. 17 is a photograph of a 50× magnification of a cross sectional view of a conventional weld line in a conventional tooling. As shown, the weld line in the conventional tooling showed an increase deformation on the back side as well as on the patterned surface.

Patents and patent applications disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A mold produced by a tooling made by a method comprising:
   providing a substantially planar tooling having a first end and a second end opposing one another, a patterned side, and a back side opposite the patterned side;
   placing the opposing ends together to form a substantially cylindrical shape forming a lumen therein, wherein the back side faces the lumen; and
   welding the ends together from the lumen such that at least the opposing ends of the back side are joined; wherein the mold comprises a joining line having a width of about 0.0025 mm to about 0.2 mm on the patterned side.

2. The mold of claim 1 wherein the step of welding the ends together comprises welding the ends together from the lumen with less than 100% penetration of a resulting weld.

3. A mold for making an article having a patterned surface, the mold comprising: a patterned surface outer surface, an inner surface, and a joining line having a weld penetration of less than about 100% of a tooling thickness.

* * * * *

UNITED STATES PATENT AND TRADEMARK OFFICE
CERTIFICATE OF CORRECTION

PATENT NO. : 6,709,258 B2
DATED : March 23, 2004
INVENTOR(S) : Paulson, Verlyn H.

It is certified that error appears in the above-identified patent and that said Letters Patent is hereby corrected as shown below:

<u>Title page,</u>
Item [56], References Cited, U.S. PATENT DOCUMENTS, please add the following reference:
-- 3,207,644    2/1997    Hobson, Jr. et al. --

Signed and Sealed this

Twenty-first Day of December, 2004

JON W. DUDAS
*Director of the United States Patent and Trademark Office*